United States Patent
Zhang et al.

(10) Patent No.: US 9,867,185 B1
(45) Date of Patent: Jan. 9, 2018

(54) METHOD AND APPARATUS FOR COMMUNICATING IN SUB-1 GHZ BANDS ACCORDING TO THE IEEE 802.11AC, IEEE 802.11AH AND IEEE 802.11AF STANDARDS

(71) Applicant: Marvell International LTD., Hamilton (BM)

(72) Inventors: Hongyuan Zhang, Fremont, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 158 days.

(21) Appl. No.: 14/558,873

(22) Filed: Dec. 3, 2014

Related U.S. Application Data (60) Provisional application No. 61/915,670, filed on Dec. 13, 2013.

(51) Int. Cl.
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
CPC ................. H04W 72/0453; H04W 84/12
See application file for complete search history.

(56) References Cited

U.S. PATENT DOCUMENTS

| | | | |
|---|---|---|---|
| 2009/0088089 A1* | 4/2009 | Chandra | H04B 7/02 455/101 |
| 2012/0238226 A1* | 9/2012 | Vermani | H04L 5/0007 455/118 |
| 2012/0276938 A1* | 11/2012 | Wagholikar | H04W 72/1215 455/514 |
| 2013/0229996 A1* | 9/2013 | Wang | H04W 72/0413 370/329 |

OTHER PUBLICATIONS

IEEE Std.802.11a-1999; Part 11: Wireless LAN Medium Access Control (MAC) and Physical Layer (PHY) Specifications: High Speed Physical Layer in the 5 GHZ Band.
(Continued)

*Primary Examiner* — Walter Divito (57) ABSTRACT

A first network device including a radio frequency (RF), baseband, and medium access control (MAC) modules. The RF module: based on a predetermined primary mode, selects a first band from bands including a sub-1 GHz, IEEE 802.11ah, and IEEE 802.11af bands; in the first band, receives a radio or intermediate frequency signal; and converts the radio or intermediate frequency signal to a baseband signal. The baseband module: based on the primary mode, selects a secondary mode and a first bandwidth from multiple bandwidths, where the secondary mode has a corresponding data rate and the bandwidths include a bandwidth downclocked from an IEEE 802.11ac or 1 MHz bandwidth; receives the baseband signal from the RF module, where the baseband signal has the first bandwidth; and based on the baseband signal, outputs a frame included in the baseband signal. The MAC module receives the frame from the baseband module at the data rate.

23 Claims, 6 Drawing Sheets

(56) References Cited

OTHER PUBLICATIONS

IEEE P802.aag/D8.2, Apr. 2003;Part 11: Wireless LAN Medium Access Control (MAC) and Physical Layer (PHY) Specifications: Further Higher Data Rate Extension in the 2.4 GHz Band.
IEEE Std. 802.11b-1999/Corr 1-2001;Part 11: Wireless LAN Medium Access Control (MAC) and Physical Layer (PHY) Specifications: Amendment 2: Higher-Speed Physical Layer (PHY) extension in the 2.4 GHz band—Corrigendum 1.
IEEE 802.11n: Multi-Rate Layered Decoder Architecture for Block LDPC Codes of the IEEE 802.11n Wireless Standard.
IEEE 802.11af/D1.05: Part 11: Wireless LAN Medium Access Control (MAC) and Physical Layer (PHY) Specifications: Amendment 4: White Spaces Operation.
IEEE P802.11ac/D2.1; Part 11: Wireless LAN Medium Access Control (MAC) and Physical Layer (PHY) Specifications: Amendment 4: Enhancements for Very High Throughput for Operation in bands below 6 GHz.
IEEE 802.11-yy; Wireless LANs; Proposed Specification Framework for TGah;Mar. 12, 2012.
IEEE Std. 802.11h-2003; 1; Wireless LAN Medium Access Control (MAC) and Physical Layer (PHY) Specifications: Amendment 5: Spectrum and Transmit Power Management Extensions in the 5 GHz band in Europe.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

* cited by examiner

METHOD AND APPARATUS FOR COMMUNICATING IN SUB-1 GHZ BANDS ACCORDING TO THE IEEE 802.11AC, IEEE 802.11AH AND IEEE 802.11AF STANDARDS

CROSS-REFERENCE TO RELATED APPLICATIONS

This application claims the benefit of U.S. Provisional Application No. 61/915,670, filed on Dec. 13, 2013. The entire disclosure of the application referenced above is incorporated herein by reference.

FIELD

The present disclosure relates to wireless local area networks, and more particularly to wireless transmission and reception in sub-1 GHz bands.

BACKGROUND

Wireless local area networks (WLANs) have evolved with the introduction of various Institute of Electrical and Electronics Engineers (IEEE) 802.11 standards such as IEEE 802.11a, IEEE 802.11b, IEEE 802.11g, IEEE 802.11n, and IEEE 802.11ac. In general, the later in time the IEEE 802.11 standard was introduced, the more data throughput provided by network devices operating according to the IEEE 802.11 standard. For example, single user (SU) data throughput of network devices operating according to IEEE 802.11b is 11 mega-bits-per-second (Mbps), whereas SU data throughput of network devices operating according to IEEE 802.11a and IEEE 802.11g is 54 Mbps. The SU data throughput of network devices operating according to IEEE 802.11n is 600 Mbps. The SU data throughput of network devices operating according to IEEE 802.11ac is greater than 1 giga-bits-per-second (Gbps).

WLANs operating according to IEEE 802.11a, IEEE 802.11b, IEEE 802.11g, IEEE 802.11n, IEEE 802.11ac, or IEEE 802.11ad operate in 2.4 giga-hertz (GHz), 5 GHz, and 60 GHz frequency bands. The 2.4 GHz, 5 GHz and 60 GHz bands refer to a 2.4-2.5 GHz frequency range, a 5.725-5.875 frequency range, and a 61-61.5 GHz frequency range. The lower the band (or frequency range), the larger the range (or distance) signals can be transmitted between network devices. To further increase the transmission distance of a network device, IEEE 802.11 standards such as IEEE 802.11ah and 802.11af have been introduced. Network devices operating according to IEEE 802.11ah and IEEE 802.11af exhibit signal transmission in sub-1 GHz frequency ranges.

A network device operating according to IEEE 802.11ah transmits and receives signals in a sub-1 GHz band (e.g., 900 MHz band). Signals are transmitted at center frequencies of less than 1 GHz with bandwidths of 2 MHz, 4 MHz, 8 MHz, or 16 MHz. The bandwidths are 10 times (10×) downclocked from bandwidths (20 MHz, 40 MHz, 80 MHz, 160 MHz) associated with IEEE 802.11ac.

SUMMARY

A first network device is provided and includes a radio frequency module, a baseband module and a medium access control module. The radio frequency module is configured to, (i) based on a predetermined primary mode, select a first band from multiple bands, where the bands include a sub-1 GHz band, an IEEE 802.11ah band, and an IEEE 802.11af band, (ii) in the first band, receive a radio frequency signal or an intermediate frequency signal, and (iii) convert the radio frequency signal or the intermediate frequency signal to a baseband signal. The baseband module configured to, (i) based on the primary mode, select a secondary mode and a first bandwidth from multiple bandwidths, where the secondary mode has a corresponding data rate, and where the bandwidths include (a) a bandwidth downclocked from an IEEE 802.11ac bandwidth, or (b) a 1 MHz bandwidth, (ii) receive the baseband signal from the radio frequency module, where the baseband signal has the first bandwidth, and (iii) based on the baseband signal, output a frame included in the baseband signal. The medium access control module configured to, based on the primary mode and the secondary mode, receive the frame from the baseband module at the data rate.

In other features, a first network device is provided that includes a medium access control module, a baseband module, and a radio frequency module. The medium access control module is configured to (i) receive a frame, and (ii) based on a primary mode, select a secondary mode, where the secondary mode has a corresponding data rate. The baseband module is configured to (i) based on the primary mode, select a secondary mode and a first bandwidth from multiple bandwidths, where the bandwidths include (a) a bandwidth downclocked from an IEEE 802.11ac bandwidth, or (b) a 1 MHz bandwidth, (ii) receive the frame from the medium access control module, and (iii) based on the secondary mode, generate a baseband signal including the frame, wherein the baseband signal has the first bandwidth. The radio frequency module is configured to, (i) based on the primary mode, select a first band from multiple bands, where the bands include a sub-1 GHz band, an IEEE 802.11ah band, and an IEEE 802.11af band, (ii) based on the baseband signal, generate a radio frequency signal or an intermediate frequency signal, and (iii) transmit the radio frequency signal in the first band.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
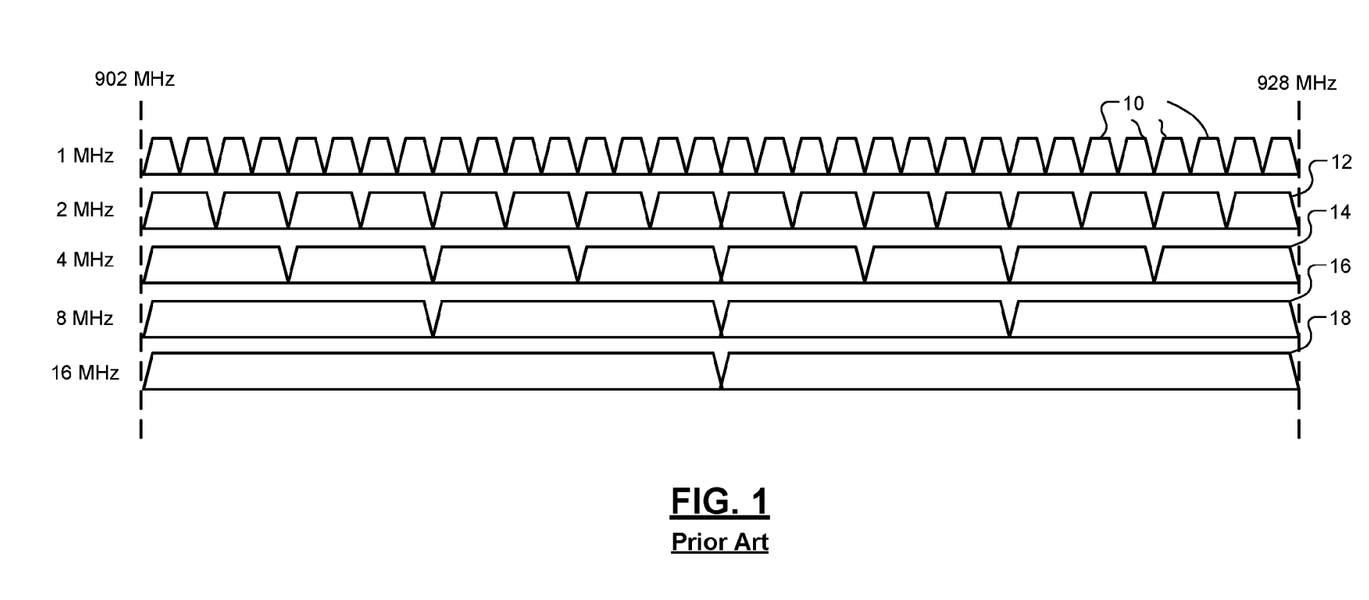
FIG. 1 is a plot showing channelization according to IEEE 802.11ah.

FIG. 1 shows channelization according to IEEE 802.11ah. Network devices operating according to IEEE 802.11ah transmit and receive signals in sub-1 GHz unlicensed bands (e.g., a 900 MHz industrial, scientific, and medical (ISM) band used in the United States of America). Frequency domain representations of the signals are shown. The signals are transmitted having bandwidths 10× downclocked from the bandwidths of IEEE 802.11ac of 20 MHz, 40 MHz, 80 MHz, and 160 MHz to the bandwidths 2 MHz, 4 MHz, 8 MHz, and 16 MHz. The IEEE 802.11ah standard, as compared to the IEEE 802.11ac standard, adds a 1 MHz bandwidth mode (sometimes referred to as the 32 fast Fourier transform (FFT) mode). As a result, bandwidths of certain signals may be 1 MHz instead of 2 MHz, 4 MHz, 8 MHz, or 16 MHz. The 1 MHz, 2 MHz, 4 MHz, 8 MHz, and 16 MHz bandwidths for the 900 MHz band are shown in FIG. 1. Some of the signals are designated 10, 12, 14, 16, and 18 for the respective bandwidths 1 MHz, 2 MHz, 4 MHz, 8 MHz, and 16 MHz.

The IEEE 802.11ah standard also adds a different preamble to transmitted frames than the preamble added to frames according to the IEEE 802.11ac standard. This is because the IEEE 802.11ah standard is associated with signal transmission in a green (or sub-1 GHz) band and does not require backward compatibility to IEEE 802.11ac. The IEEE 802.11ah preamble, unlike the preamble of IEEE 802.11ac, does not have a Legacy portion with respective fields. The IEEE 802.11ah has a very high throughput (VHT) or high throughput (HT) portion with respective fields. The Legacy portion and the (V)HT portion include fields such as short training fields, long training fields, signal fields, double guard interval fields, short training symbols and long training symbols. The preamble may be different for a single user (SU) application (referring to transmission of frames to a single user device) than a multi-user (MU) application (referring to transmission of frames to multiple user devices). IEEE 802.11ah also introduced 1 MHz and 2 MHz bandwidth duplicate modes, which refer to additional 1 MHz and 2 MHz bands that may be used by overlapping basic service set (OBSS) devices. The bandwidth duplicate modes are provided to assure accurate signal decoding at the OBSS devices, which may be operating in 1 MHz or 2 MHz sub-bands of basic service set (BSS) devices.

Figure 2:
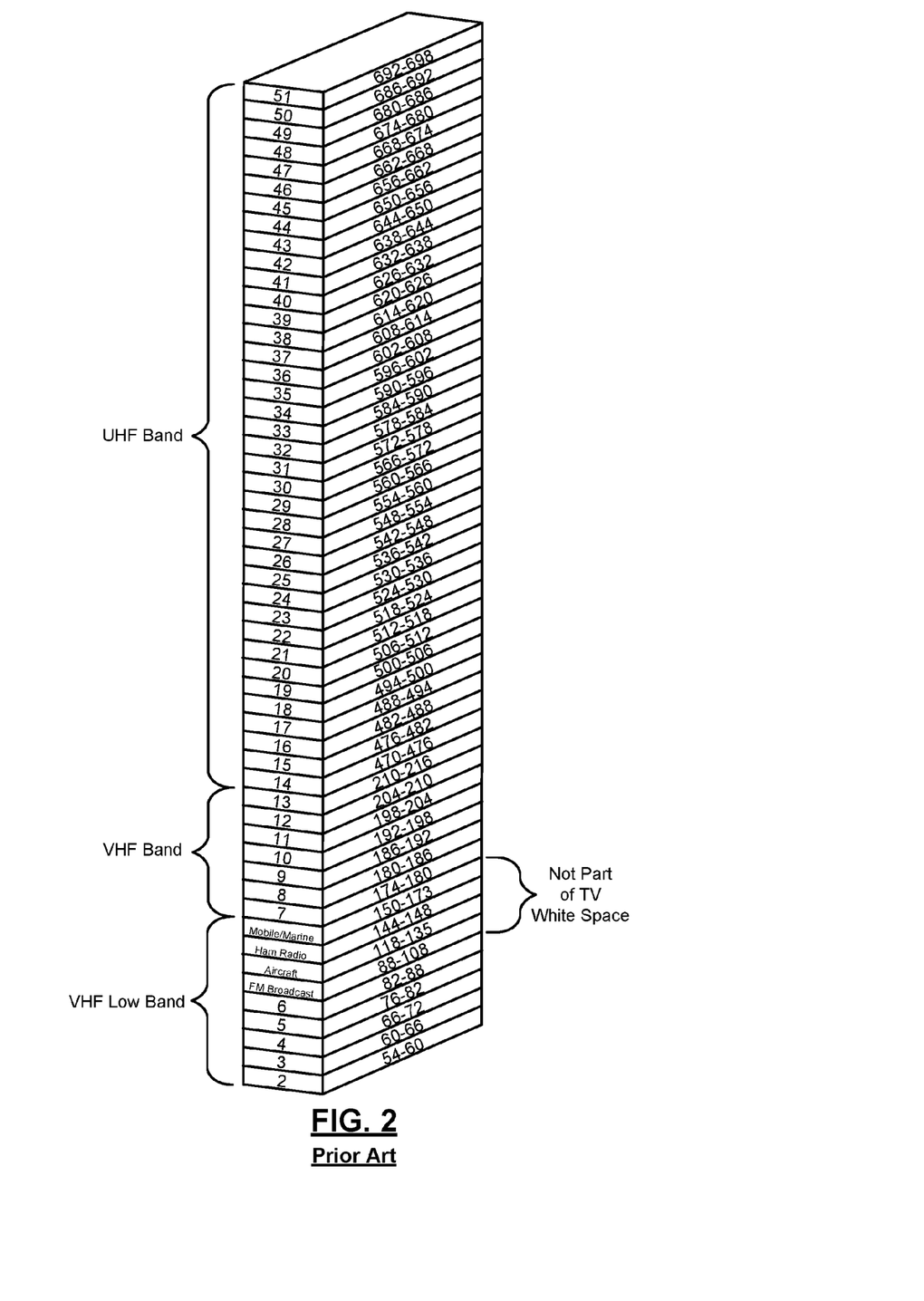
FIG. 2 is a diagram illustrating non-used television channels.

FIG. 2 shows a diagram illustrating non-used (or unlicensed) television (TV) channels. The term "channel" as used herein refers to a band of frequencies. Network devices operating according to IEEE 802.11af transmit and receive signals on non-used TV channels (referred to as white space). The TV channels are identified as channels 2-51 and are 6 MHz channels. Channels having frequencies 88-173 MHz are used for respective purposes identified in FIG. 2 and thus are not considered white space. The non-used TV channels, including very high frequency (VHF) channels and ultra-high frequency (UHF) channels, are at sub-1 GHz frequencies. The VHT frequencies are 54-88 MHz and 174-216 MHz. The UHT frequencies are 470-698 MHz. Signals transmitted over the non-used TV channels have bandwidths: 7.5× downclocked from the bandwidth of IEEE 802.11ac 40 MHz to a bandwidth of 5.33 MHz and in a 6 MHz or 7 MHz TV channel; or 5.625× downclocked from the bandwidth of IEEE 802.11ac 40 MHz to a bandwidth of 7.11 MHz and in a 8 MHz TV channel (e.g., a European TV channel). IEEE 802.11af allows for optional channel bonding. This includes transmitting a single signal over two TV channels.

Preambles of frames transmitted according to IEEE 802.11af are the same as preambles of frames transmitted according to IEEE 802.11ac. IEEE 802.11af includes the same non-HT duplicate modes as provided in IEEE 802.11ac. The non-HT duplicate modes refer to a 20 MHz 802.11a frame format or a 20 MHz 802.11g frame format that is duplicated in each 20 MHz sub-channel of a 40 MHz, 80 MHz, or 160 MHz channel. This is provided to assure accurate signal decoding at the OBSS devices, as similarly described above with respect to the bandwidth duplicate modes.

The following examples include network devices capable of operating in multiple modes, where each of the modes is fully or partially compliant with IEEE 802.11ac, IEEE 802.11ah, and/or IEEE 802.11af. The network devices are capable of (i) selecting one of the modes, and (ii) transmitting and receiving signals in bands and at center frequencies and having bandwidths corresponding to the selected mode. The bands of the selected modes may be in the sub-1 GHz band. This allows each of the network devices to communicate in each of the selected bands based on a preselected range (distance between network devices), a predetermined data throughput (or predetermined transmission rate), and/or other predetermined parameter.

Figure 3:
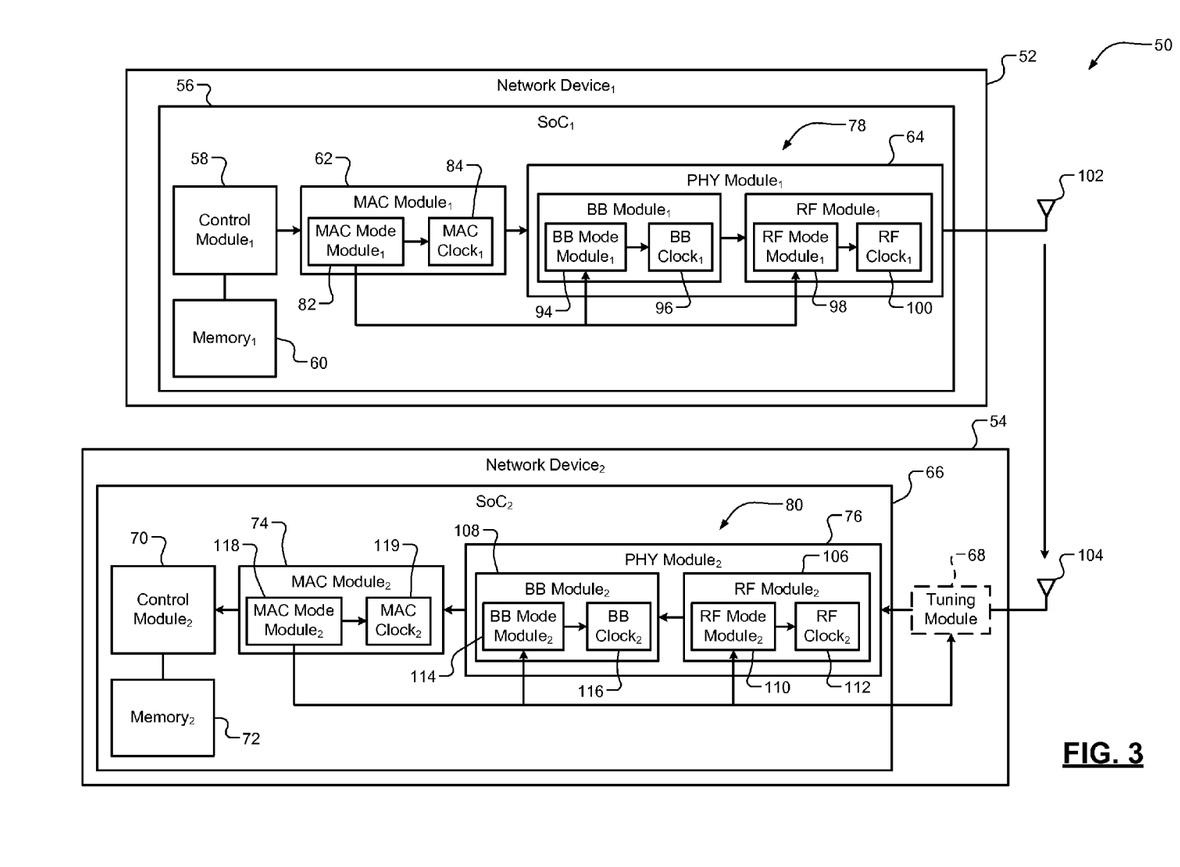
FIG. 3 is a functional block diagram of a WLAN incorporating network devices configured according to an embodiment of the present disclosure.

FIG. 3 shows a WLAN 50 incorporating a first network device 52 and a second network device 54. Although two network devices are shown, any number of network devices may be included in the WLAN 50. The network devices 52, 54 may be, for example, computers, mobile devices, cellular devices, appliances, etc. Also, although the first network device 52 is shown as a transmitting device and the second network device 54 is shown as a receiving device, each of the network devices 52, 54 may be configured to both transmit and receive signals according to the various modes of operation disclosed herein.

The first network device 52 includes a first system-on-chip (SoC) 56. The first SoC 56 includes a first control module 58, a first memory 60, a first media access control (MAC) module 62, and a first physical layer (PHY) module 64. The first control module 58 may include the modules 62, 64. The second network device 54 includes a second SoC 66 and may include a tuner module 68. The tuner module 68 may include and/or be implemented as a tuner. The second SoC 66 includes a second control module 70, a second memory 72, a second MAC module 74, and a second PHY module 76. The second control module 66 may include the modules 74, 76.

Although a transmit path 78 and corresponding modules and devices are shown for the first MAC module 62 and the first PHY module 64, the first MAC module 62 and the first PHY module 64 may include a receive path and corresponding modules and devices similar to the second network device 54. Although a receive path 80 and corresponding modules and devices are shown for the second MAC module 74 and the second PHY module 76, the second MAC module 74 and the second PHY module 76 may include a transmit path and corresponding modules and devices similar to the first network device 52.

The first control module 58 may access data in the memory 60 and forward the data to the first MAC module 62. The first control module 58 may (i) control flow of traffic in the WLAN 50 and between the network devices 52, 54 (and/or between the network device 52 and other network devices in the WLAN 50), and/or (ii) select a primary (or global) mode. For example, the first control module 58 may select a primary mode based on a preselected range, a predetermined data throughput (or predetermined transmission rate), and/or other predetermined parameter. The primary mode may, for example, be one of seven or more modes. Examples of seven different modes are described below. As an alternative to the first control module 58 selecting the primary mode, the first MAC module 62 may select the primary mode. The modules 62, 64, 74, 76 operate according to the primary mode.

The first MAC module 62 may include a MAC mode module 82 and a first MAC clock 84. The MAC mode module 82 may, based on the primary mode, select a first MAC (or secondary/local) mode and signal the first MAC clock 84 to generate a first MAC clock signal based on the first MAC mode. The first MAC module 62, based on the first MAC clock signal, may generate frames and transmit the frames to the first PHY module 64. Each of the frames may be in a predetermined format having a predetermined MAC header, a MAC service data unit (MSDU), and a frame correction sequence (FCS).

The first PHY module 64 may include a first baseband (BB) module 90 and a first radio frequency (RF) module 92. The first BB module 90 may include a first BB mode module 94 and a first BB clock 96. The first BB mode module 90, based on the primary mode, may select a first BB (or secondary/local) mode and signal the first BB clock 96 to generate a first BB clock signal. The first BB module 90 may generate a BB signal based on the frames from the first MAC module 62 and according to the first BB mode and the first BB clock signal.

The first RF module 92 may include a first RF mode module 98 and a first RF clock 100. The first RF mode module 98, based on the primary mode, may select a first RF (or secondary/local) mode and signal the first RF clock to generate a third clock signal. The first RF module 92 may generate a RF signal based on the BB signal and according to the first RF mode.

The tuner module 68 and/or the second PHY module 76 may receive the RF signal from the first PHY module 64 via antennas 102, 104 of the network devices 52, 54. The tuner module 68 may tune to a band and/or center frequency based on the primary mode. The second PHY module 76 and/or the second MAC module 74 may determine the primary mode based on, for example, a beacon transmitted by the first PHY module 64. The beacon may be transmitted prior to transmission of the RF signal. The beacon may indicate the primary mode and/or may include information indicative of the primary mode. The beacon may be, for example, an IEEE 802.11ac, IEEE 802.11ah, and/or IEEE 802.11af compliant beacon. Alternatively, the beacon may not be compliant to an IEEE 802.11ac, IEEE 802.11ah, and/or IEEE 802.11af. The beacon may be coded such that certain network devices and/or corresponding modules of the network devices are configured to decode the beacon. In one embodiment, network devices and/or corresponding modules of the network devices that are configured to operate in the primary modes and secondary modes described herein are able to decode the beacon. This is because these network devices and/or corresponding modules are pre-configured with decoding information used to decode the beacon. The decoding information may include, for example, a code and/or other information applicable to decoding the beacon.

As an alternative, the PHY modules 64, 76 may perform a hand-shake process exchanging information to determine the primary mode. This is further described below with respect to the methods of FIGS. 6-7. In one embodiment, the second MAC module 74 determines the primary mode and indicates the primary mode to the second PHY module 76. The tuner module 68 may downconvert the RF signal to an intermediate frequency (IF) signal.

The second PHY module 76 may include a second RF module 106 and a second BB module 108. The second RF module 106 may include a second RF mode module 110 and a second RF clock 112. The second RF mode module 110 may (i) receive an indication of the primary mode from the second MAC module 74, and (ii) based on the primary mode, select a second RF mode and signal the second RF clock 112 to generate a second RF clock signal. The second RF module 106 may downconvert the RF signal or the IF signal to a BB signal according to the second RF mode and second RF clock signal. The second RF module 106 may include the tuner module 68.

The second BB module 108 may include a second BB mode module 114 and a second BB clock 116. The second BB mode module 114 may (i) receive an indication of the primary mode from the second MAC module 74, and (ii) based on the primary mode, select a second BB mode and signal the second BB clock 116 to generate a second BB clock signal. The second BB module 108 may receive the BB signal generated by the second RF module 106 according to the second BB mode and the second BB clock signal. The BB signal is processed to provide the originally transmitted frames. The second MAC module 74 may include a second MAC mode module 118 and a second MAC clock 119. The second MAC mode module 118 may, based on the primary mode, select a second MAC mode and signal the second MAC clock 119 to generate a second MAC clock signal. The second control module 70 receives the frames from the second MAC module 74 based on the second MAC clock signal. The second control module 70 may store the frames in the second memory 72.

The RF modules 92, 106 may include and/or be implemented as circuits having one or more amplifiers, filters, mixers, local oscillators, converters (e.g., analog-to-digital (A/D) converters, D/A converters, downconverters, and/or upconverters), etc. The local oscillators may receive the clock signals generated by the RF clocks 100, 112 or modified versions of the clock signals. The RF modules 92, 106 may perform (i) RF-to-BB or IF-to-BB signal conversions, and (ii) BB-to-IF or BB-to-RF signal conversions. The BB modules 90, 108 may include and/or be implemented as circuits having one or more amplifiers, filters, converters (A/D or D/A converters), sample rate converters, equalizers, decoders, encoders, etc. Each of the BB modules 90, 108 may (i) receive frames from a corresponding one of the MAC modules 62, 74, and generate BB signals, and/or (ii) receive BB signals from a corresponding one of the RF modules 92, 106 and output frames to a corresponding one of the MAC modules 62, 74.

The modules 62, 64, 74, 76, 90, 92, 106, 108 operate in the primary modes and in respective secondary modes. The primary modes may be sub-1 GHz modes. Primary mode 1 may fully support IEEE 802.11ah and include RF transmission in an IEEE 802.11ah band (e.g., 900 MHz band). Fully supporting a standard refers to network devices operating in the corresponding mode such that the network devices fully comply with the requirements of the standard. Partially supporting a standard refers to network devices operating in a corresponding mode such that the network devices comply with some of the requirements of the standard. Network devices operating in primary mode 1 may operate according to IEEE 802.11ah. Primary mode 2 may partially support IEEE 802.11ac and/or IEEE 802.11ah and include RF transmission in an IEEE 802.11ah band. Network devices operating in primary mode 2 may partially operate according to IEEE 802.11ah. Primary mode 3 may fully support IEEE 802.11af, partially support IEEE 802.11ac, and include RF transmission in an IEEE 802.11af band (e.g., a TV white space band). Network devices operating in primary mode 3 may operate according to IEEE 802.11af.

Primary mode 4 may partially support IEEE 802.11ac, IEEE 802.11ah, and/or IEEE 802.11af. RF modules operating according to primary mode 4 may transmit and receive RF signals in an IEEE 802.11af band and having an IEEE 802.11ah bandwidth (e.g., 2 MHz, 4 MHz, 8 MHz, or 16 MHz) or a IEEE 802.11af bandwidth (e.g., 6 MHz). Primary mode 5 may partially support IEEE 802.11ac, IEEE 802.11ah and/or IEEE 802.11af. RF modules operating according to primary mode 5 may transmit and receive RF signals in an IEEE 802.11ah band and having an IEEE 802.11ah bandwidth.

Primary mode 6 may partially support IEEE 802.11ac and/or IEEE 802.11ah. RF modules operating according to primary mode 6 may transmit and receive RF signals in an IEEE 802.11ah band and having an IEEE 802.11ah bandwidth. Primary mode 7 may partially support IEEE 802.11ac, IEEE 802.11ah and/or IEEE 802.11af. RF modules operating according to primary mode 7 may transmit and receive RF signals in an IEEE 802.11ah band and having an IEEE 802.11ah bandwidth.

The secondary modes of the modules 62, 64, 74, 76, 90, 92, 106, 108 are selected based on the primary mode of operation. Tables 1-3 below includes secondary modes for each of the modules 62, 64, 74, 76, 90, 92, 106, 108. Table 4 below shows secondary modes for each of the modules 62, 64, 74, 76, 90, 92, 106, 108 corresponding to each of the corresponding primary modes. Although not mentioned in the below tables, a MAC module operating according to IEEE 802.11af protocols operates similar to a MAC module operating according to IEEE 802.11ac protocols. However, the MAC module operating according to IEEE 802.11af protocols may include a database to support channel access in TV white space. The database is used to store and track free (unused) TV white space channels on which a RF signal may be transmitted in a WLAN network (e.g., Wi-Fi™ network). Although certain combinations of secondary and primary modes are disclosed in the tables, other combinations of the modes may be used. Although the primary modes and the secondary modes are described with respect to certain example data rates, bands, bandwidths, and center frequencies, each of the primary modes and each of the secondary modes may correspond to other data rates, bands, bandwidths, and/or center frequencies.

TABLE 1

RF Secondary Modes

| RF Secondary Mode | RF Module (e.g., one of RF modules 92, 106) |
|---|---|
| Mode 1 | Operate according to IEEE 802.11ah to transmit or receive RF signals in 802.11ah band (e.g., 900 MHz band) having 2 MHz, 4 MHz, 8 MHz or 16 MHz bandwidth. Also, support transmission and reception of signals having a TV channel bandwidth (e.g., 6 MHz). |
| Mode 2 | Operate according to IEEE 802.11ah to transmit or receive RF signals in 802.11ah band (e.g., 900 MHz band) having 2 MHz, 4 MHz, 8 MHz or 16 MHz bandwidth. RF module |

TABLE 1-continued

RF Secondary Modes

| RF Secondary Mode | RF Module (e.g., one of RF modules 92, 106) |
|---|---|
| | and/or corresponding tuner module is configured to be tuned to a selected TV band and corresponding center frequency. |

TABLE 2

BB Secondary Modes

| BB Secondary Modes | BB Module (e.g., one of the BB modules 90, 108) |
|---|---|
| Mode 1 | Operate according to IEEE 802.11ah. BB module to generate BB signals 10× downclocked from IEEE 802.11ac BB signals (e.g., 20 MHz, 40 MHz, 80 MHz or 160 MHz to 2 MHz, 4 MHz, 8 MHz or 16 MHz). Support receiving and transmitting 1 MHz bandwidth signals (referred to as 1 MHz mode). Generate BB signals with IEEE 802.11ah preambles. For example, IEEE 802.11ah preambles do not include IEEE 802.11ac legacy fields for single user frames, but do include very high throughput (or high throughput) fields. As another example, IEEE 802.11ah preambles may have different formats for single user frames versus multi-user frames. |
| Mode 2 | Operate according to IEEE 802.11af. BB module to generate BB signals 7.5× downclocked from IEEE 802.11ac BB signals (e.g., downclocked from 40 MHz bandwidth to 5.33 MHz bandwidth). |
| Mode 3 | Operate according to IEEE 802.11ah. BB module to generate BB signals 10× downclocked from IEEE 802.11ac BB signals. BB signals include frames with IEEE 802.11ac preambles. |

TABLE 3

MAC Secondary Modes

| MAC Secondary Mode | MAC Module (e.g., one of the MAC modules 62, 74) |
|---|---|
| Mode 1 | Operate according to IEEE 802.11ac MAC protocols downclocked based on predetermined downclock ratio of corresponding BB module. MAC defined inter-frame space (IFS) values for receive and transmit processing times are also increased by and/or based on the downclock ratio. For example, if the downclock ratio is 10× (or 10:1), then the IFS values are multiplied by 10. |
| Mode 2 | Operate according to IEEE 802.11ah to generate or receive frames based on IEEE 802.11ac MAC protocols and having short frame formats according to IEEE 802.11ah with slot based channel access. The frame formats may include only required features (e.g., shorter MAC headers and shorter null data packets) of 802.11ac MAC frame formats. |

TABLE 4

Primary Modes and Corresponding Secondary Modes

| Primary Mode | RF Module (one of the RF modules 92, 106) | BB Module (one of the BB modules 90, 108) | MAC Module (one of the MAC modules 62, 74) |
|---|---|---|---|
| Mode 1 | RF Secondary Mode 1 - generate RF signals having IEEE 802.11ah bandwidth (e.g., 2 MHz, 4 MHz, 8 MHz or 16 MHz) and transmit in a sub-1 GHz unlicensed band (e.g., 900 MHz band or band under 1 GHz) having a center frequency based on IEEE 802.11ah channel. | BB Secondary Mode 1 - operate according to IEEE 802.11ah. BB module to generate BB signals 10× downclocked from IEEE 802.11ac BB signals. Support receiving and transmitting 1 MHz bandwidth signals. Generate BB signals with IEEE 802.11ah preambles. For example, IEEE 802.11ah preambles do not include IEEE 802.11ac legacy fields for single user frames, but do include very high throughput (or high throughput) fields. As another example, IEEE 802.11ah preambles may have different formats for single user frames versus multi-user frames. | MAC Secondary Mode 2 - operate according to IEEE 802.11ah to generate or receive frames based on IEEE 802.11ac MAC protocols and having short frame formats according to IEEE 802.11ah with slot based channel access. In one embodiment, the frame formats may include only required features of 802.11ac MAC frame formats. |
| Mode 2 | RF Secondary Mode 1 - generate RF signals having IEEE 802.11ah bandwidth (e.g., 2 MHz, 4 MHz, 8 MHz or 16 MHz) and transmit in a sub-1 GHz unlicensed band (e.g., 900 MHz band or band under 1 GHz) having a center frequency based on IEEE 802.11ah channel. | BB Secondary Mode 1 - operate according to IEEE 802.11ah. BB module to generate BB signals 10× downclocked from IEEE 802.11ac BB signals. Support receiving and transmitting 1 MHz bandwidth signals. Generate BB signals with IEEE 802.11ah preambles. For example, IEEE 802.11ah preambles do not include IEEE 802.11ac legacy fields for single user frames, but do include very high throughput (or high throughput) fields. As another example,IEEE 802.11ah preambles may have different formats for single user frames versus multi-user frames. | MAC Secondary Mode 1 - operate according to IEEE 802.11ac MAC protocols downclocked based on predetermined downclock ratio of corresponding BB module. MAC defined IFS values for receive and transmit processing time are also increased by and/or based on the downclock ratio. |
| Mode 3 | RF Secondary Mode 2 - operate according to IEEE 802.11ah to transmit or receive RF signals in 802.11ah band (e.g., 900 MHz and) having IEEE 802.11af bandwidth (e.g., 6 MHz). RF module and/or corresponding tuner module is configured to be tuned to a selected TV band (e.g., a VHT or UHF band) and corresponding center frequency. The RF signals may be at IEEE 802.11af center frequencies and transmitted in corresponding channels. | BB Secondary Mode 2 - operate according to IEEE 802.11af. BB module to generate BB signals 7.5× downclocked from IEEE 802.11ac BB signals | MAC Secondary Mode 1 - operate according to IEEE 802.11ac MAC protocols downclocked based on predetermined downclock ratio of corresponding BB module. MAC defined IFS values for receive and transmit processing time are also increased by and/or based on the downclock ratio. |
| Mode 4 | RF Secondary Mode 2 - operate according to IEEE 802.11ah to transmit or receive RF signals in 802.11ah band (e.g., 900 MHz band) having IEEE 802.11af bandwidth (e.g., 6 MHz) or an IEEE 802.11ah bandwidth (e.g., 4 MHz). RF module and/or corresponding tuner module is configured to be | BB Secondary Mode 1 - operate according to IEEE 802.11ah. BB module to generate BB signals 10× downclocked from IEEE 802.11ac BB signals. Generate BB signals with IEEE 802.11ah preambles. For example, IEEE 802.11ah preambles do not include IEEE 802.11ac legacy fields for single user frames, but do | MAC Secondary Mode 1 - operate according to IEEE 802.11ac MAC protocols downclocked based on predetermined downclock ratio of corresponding BB module. MAC defined IFS values for receive and transmit processing time are |

TABLE 4-continued

Primary Modes and Corresponding Secondary Modes

| Primary Mode | RF Module (one of the RF modules 92, 106) | BB Module (one of the BB modules 90, 108) | MAC Module (one of the MAC modules 62, 74) |
|---|---|---|---|
| | tuned to a selected TV band (e.g., a VHT or UHF band) and corresponding center frequency. The RF signals may be at IEEE 802.11af center frequencies and transmitted in frames. corresponding channels. | include very high throughput (or high throughput) fields. As another example, IEEE 802.11ah preambles may have different formats for single user frames versus multi-user In one embodiment, BB signals have only 4 MHz or other predetermined bandwidth. | also increased by and/or based on the downclock ratio. |
| Mode 5 | RF Secondary Mode 2 - operate according to IEEE 802.11ah to transmit or receive RF signals in 802.11ah band (e.g., 900 MHz band) having IEEE 802.11af bandwidth (e.g., 6 MHz) or an IEEE 802.11ah bandwidth (e.g., 4 MHz). RF module and/or corresponding tuner module is configured to be tuned to a selected TV band (e.g., a VHT or UHF band) and corresponding center frequency. The RF signals may be at IEEE 802.11af center frequencies and transmitted in corresponding channels. | BB Secondary Mode 3 - operate according to IEEE 802.11ah. BB module to generate BB signals 10× downclocked from IEEE 802.11ac BB signals having 40 MHz bandwidth to have 4 MHz bandwidth. BB signals include frames with IEEE 802.11ac preambles. | MAC Secondary Mode 1 - operate according to IEEE 802.11ac MAC protocols downclocked based on predetermined downclock ratio of correspondingBB module. MAC defined IFS values for receive and transmit processing time are also increased by and/or based on the downclock ratio. |
| Mode 6 | RF Secondary Mode 1 - generate RF signals having IEEE 802.11ah bandwidth (e.g., 2 MHz, 4 MHz, 8 MHz or 16 MHz) and transmit in a sub-1 GHz unlicensed band (e.g., 900 MHz band or band under 1 GHz) having a center frequency based on IEEE 802.11ah channel. | BB Secondary Mode 3 - operate according to IEEE 802.11ah. BB module generates BB signals 10× downclocked from IEEE 802.11ac BB signals to have 2 MHz, 4 MHz, 8 MHz or 16 MHz bandwidth. BB signals include frames with IEEE 802.11ac preambles. | MAC Secondary Mode 1 - operate according to IEEE 802.11ac MAC protocols downclocked based on predetermined downclock ratio of corresponding BB module. MAC defined IFS values for receive and transmit processing time are also increased by and/or based on the downclock ratio. |
| Mode 7 | RF Secondary Mode 1 - generate RF signals having IEEE 802.11ah bandwidth and transmit in a sub-1 GHz unlicensed band (e.g., 900 MHz band or band under 1 GHz) having a center frequency based on IEEE 802.11ah channel. In one embodiment, the bandwidth may be set to only 8 MHz or other predetermined bandwidth. | BB Secondary Mode 2 - operate according to IEEE 802.11af. BB module to generate BB signals 7.5× downclocked from IEEE 802.11ac BB signals. | MAC Secondary Mode 1 - operate according to IEEE 802.11ac MAC protocols downclocked based on predetermined downclock ratio of corresponding BB module. MAC defined IFS values for receive and transmit processing time are also increased by and/or based on the downclock ratio. |

Each of the above-described modules 58, 62, 64, 70, 74, 76, 90, 92, 106, 108 of the network devices 52, 54 may support one or more of the primary modes and one or more of the corresponding secondary modes. The modules 58, 62, 64, 70, 74, 76, 90, 92, 106, 108 may also support operating according to IEEE 802.11ac. Using different clock rates in the MAC modules 62, 74, the BB modules 90, 108 and the RF modules 92, 106, different RF bands and bandwidths are supported. The modules 58, 62, 64, 70, 74, 76, 90, 92, 106, 108 may switch among operating fully or partially according to IEEE 802.11ac, IEEE 802.11ah, and IEEE 802.11af. When operating fully or partially according to each of these standards, the network devices 52, 54 and/or corresponding modules 58, 62, 64, 70, 74, 76, 90, 92, 106, 108 may operate in a fully supported IEEE 802.11ac mode, a partially supported IEEE 802.11ac mode, a fully supported IEEE 802.11ah mode, a partially supported IEEE 802.11ah mode, a fully supported IEEE 802.11af mode, and/or a partially supported IEEE 802.11af mode.

Figure 4:
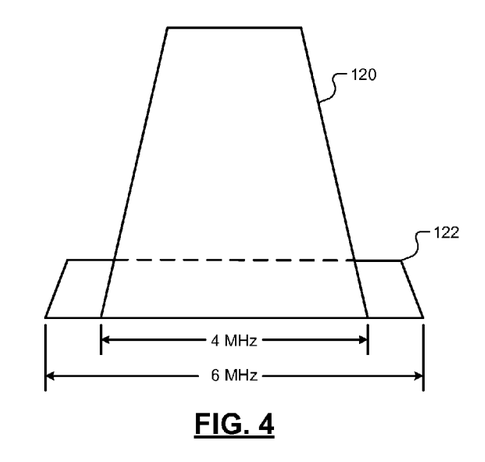
FIG. 4 illustrates a frequency domain representation of a signal transmitted according to a primary mode of an embodiment of the present disclosure.

FIG. 4 shows a frequency domain representation of a signal 120 transmitted according to a primary mode. As an example, the signal 120 may be a RF signal transmitted according to the primary mode 4 or the primary mode 5. Bandwidth of the RF signal may be 4 MHz and bandwidth of a corresponding channel 122 may be 6 MHz. The RF signal may be a 4 MHz IEEE 802.11ah waveform (or 10× downclocked 40 MHz IEEE 802.11ac waveform).

Figure 5:
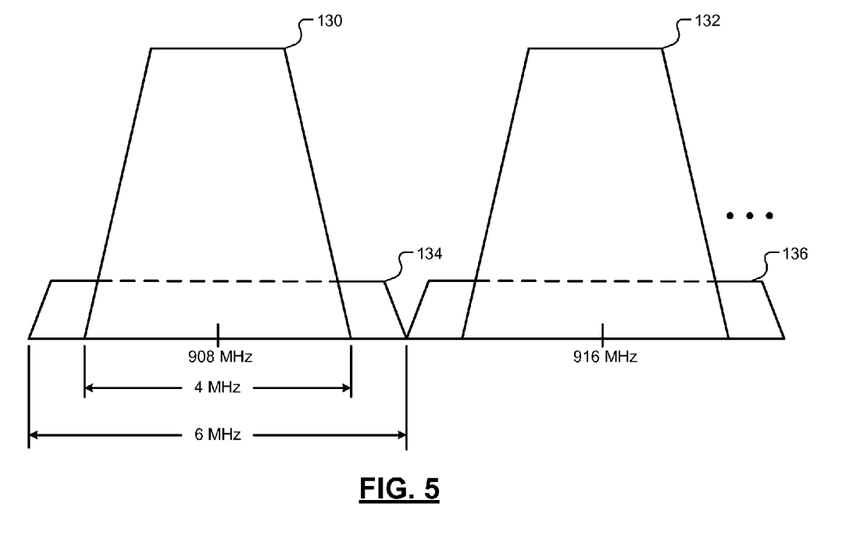
FIG. 5 illustrates a frequency domain representation of signals transmitted according to another primary mode of an embodiment of the present disclosure.

FIG. 5 shows a frequency domain representation of signals 130, 132 transmitted according to another primary mode. As an example, the signals 130, 132 may be RF signals transmitted according to the primary mode 7. Bandwidth of each of the RF signals may be 5.33 MHz and bandwidth of each of the corresponding channels 134, 136 may be 8 MHz. The RF signals are transmitted in the 900 MHz band (or 902-928 MHz).

Figure 6:
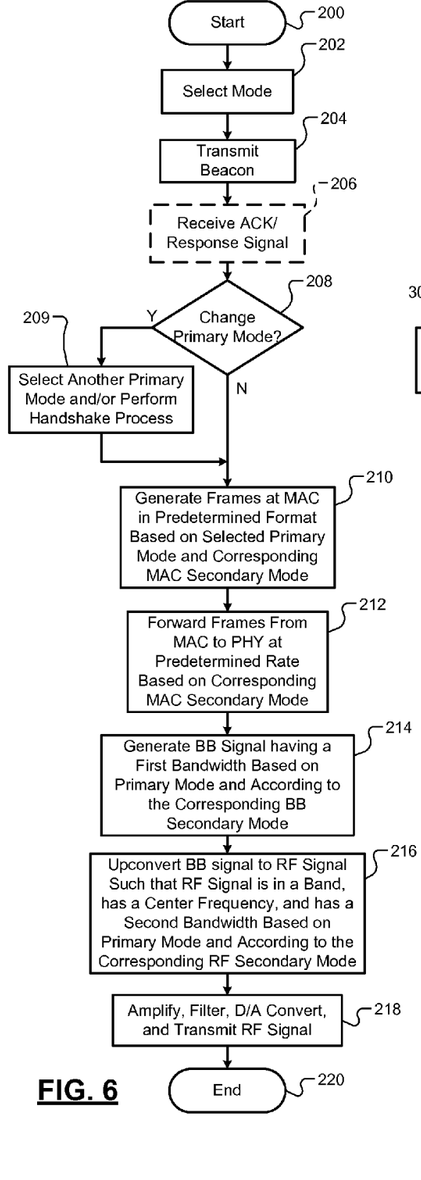
FIG. 6 illustrates a transmission method in accordance with an embodiment of the present disclosure.
Figure 7:
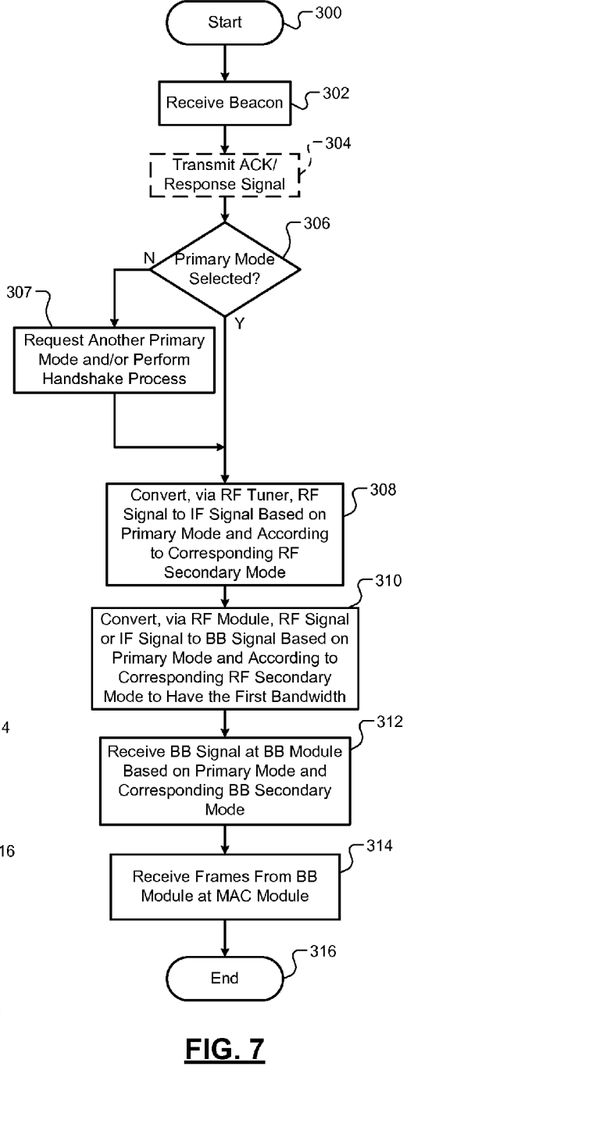
FIG. 7 illustrates a reception method in accordance with an embodiment of the present disclosure.
Figure 8:
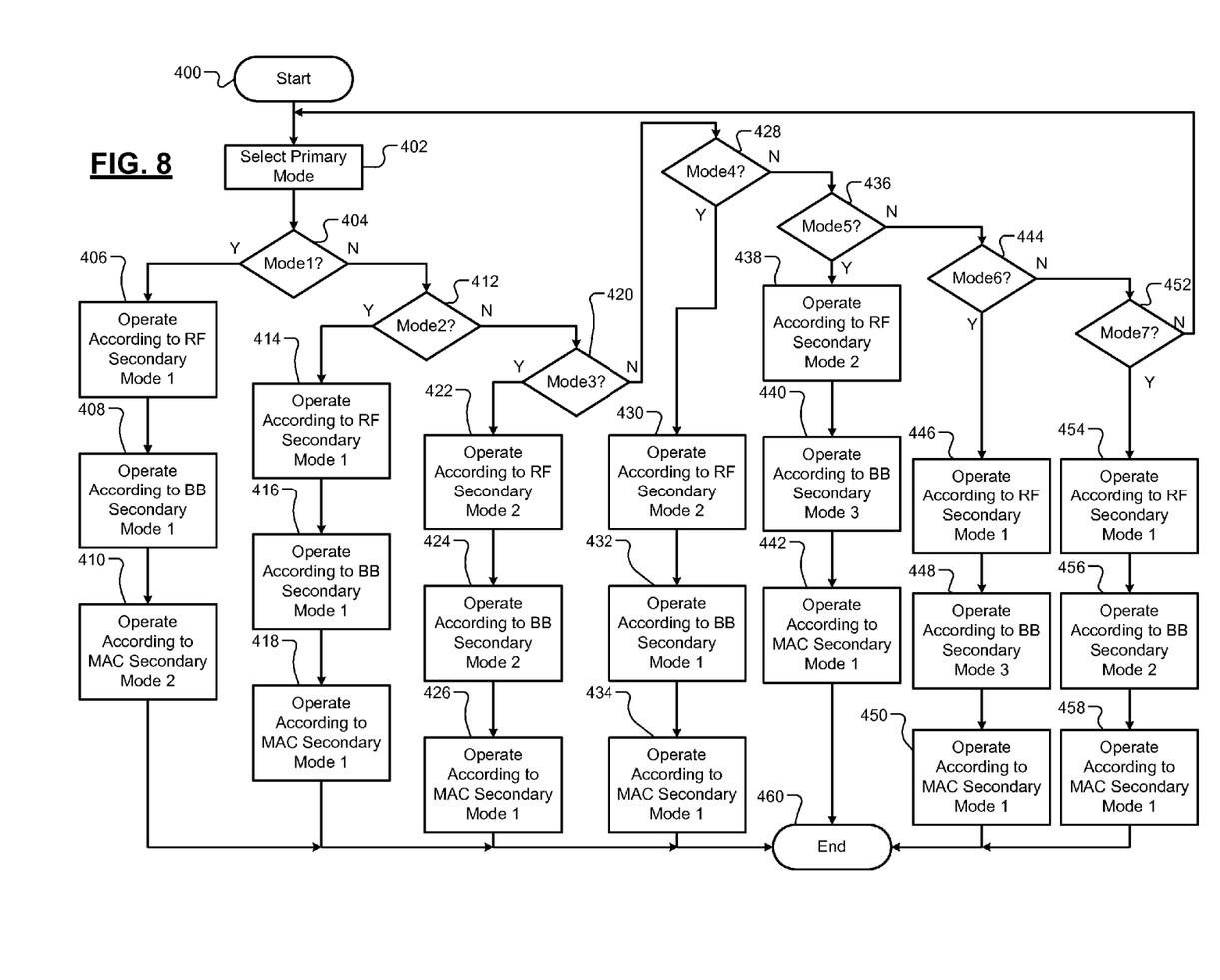
FIG. 8 illustrates a mode selecting method in accordance with an embodiment of the present disclosure.

The network devices 52, 54 disclosed herein may be operated using numerous methods, example methods are illustrated in FIGS. 6-8. In FIG. 6, a transmission method is shown. Although the following tasks are primarily described with respect to the implementations of FIG. 3 and Tables 1-4, the tasks may be easily modified to apply to other implementations of the present disclosure. The tasks may be iteratively performed.

The method may begin at 200. At 202, the first MAC module 62 may select a primary mode as described above. At 204, the first PHY module 64 may transmit a beacon indicating the primary mode. At 206, the first PHY module 64 may receive a response signal (or acknowledgement (ACK) signal) from the second PHY module 76. The response signal may indicate whether the second network device 54 accepts operation in the selected primary mode or whether to select or switch to another primary mode. The second network device 54 and/or the second MAC module 74 may request and/or select a different primary mode and/or indicate one or more other primary modes that are acceptable to the second network device 54. In one embodiment, the first PHY module 64 does not receive a response signal from the second PHY module 76.

At 208, the first MAC module 62 may determine whether to change the selected primary mode based on the response signal. If the primary mode is to be changed, task 209 may be performed, otherwise task 210 is performed. At 209, the first MAC module 62 may agree to operate in the primary mode selected by the second network device 54 or select another primary mode (e.g., one of the primary modes indicated by the response signal). The first MAC module 62 may perform a "handshake" process exchanging information with the second MAC module 74 to determine the appropriate primary mode for each of the network devices 52, 54. The information may be exchanged via the PHY modules 64, 76. This information may include, for example, primary modes, secondary modes, data rates, frequencies, bands, bandwidths, center frequencies, for which each of the network devices 52, 54 is capable of communicating. Task 210 may be performed subsequent to task 209. Task 209 may be performed in addition to or instead of performing tasks 202-208.

At 210, the first MAC module 62 may receive data from the first control module 58 and generate frames (including the data) according to the selected and/or agreed to (or resulting) primary mode. The frames are generated according to a MAC secondary mode corresponding to the resulting primary mode. At 212, the first MAC module 62 forwards the frames to the first BB module 90 at a predetermined rate based on the corresponding MAC secondary mode.

At 214, the first BB module 90 generates a BB signal (including the frames) having a first bandwidth based on the resulting primary mode and a corresponding BB secondary mode. The first BB module 90 may signal process the BB signal including, for example, encoding, amplifying, filtering, etc. At 216, the first RF module 92 upconverts the BB signal to generate a RF signal. The RF signal is generated based on the resulting primary mode and a corresponding RF secondary mode. The RF signal may be transmitted on a channel and center frequency and have a second bandwidth according to the RF secondary mode. At 218, the first BB module 90 may filter, amplify, and/or D/A convert the RF signal and transmit the RF signal to the second PHY module 76. The method may end at 220.

In FIG. 7, a reception method is shown. Although the following tasks are primarily described with respect to the implementations of FIGS. 3 and 6 and Tables 1-4, the tasks may be easily modified to apply to other implementations of the present disclosure. The tasks may be iteratively performed. Some of the tasks of FIG. 7 may be performed by the second network device 54 while some of the tasks of FIG. 6 are performed by the first network device 52.

The method may begin at 300. At 302, the second PHY module 76 receives the beacon from the first PHY module 64. At 304, the second MAC module 74 begins to operate in the primary mode initially selected by the first MAC module 62 and/or generates the response signal. The response signal may indicate acceptance of the initially selected primary mode or request a different primary mode, as described above.

At 306, the second MAC module 74 may determine whether another primary mode is to be selected. If another primary mode is to be selected, task 307 may be performed, otherwise task 308 may be performed. At 307, the second MAC module 74 may perform the handshake process described above with the first MAC module 62. Task 308 may be performed subsequent to task 307. Task 307 may be performed in addition to or instead of performing tasks 302-306.

At 308, the tuner module 68 receives the RF signal from the first PHY module 62. The RF signal is received in the band, at the center frequency and having the second bandwidth according to the resulting primary mode and the corresponding RF secondary mode. The tuner module 68 may amplify, filter, A/D convert and/or downconvert the received RF signal to an intermediate frequency (IF) signal according to the resulting primary mode and/or a corresponding secondary mode. The secondary mode may be the same as the corresponding RF secondary mode for the resulting primary mode. In one embodiment, task 308 is not performed and task 310 is performed subsequent to task 306.

At 310, the second RF module 106 receives and downconverts the RF signal or the IF signal to a BB signal according to the resulting primary mode, the corresponding RF secondary mode, and/or the corresponding BB secondary mode. The BB signal may have the first bandwidth, as the BB signal generated at 214. At 312, the second BB module 108 receives the BB signal, signal processes the BB signal, and outputs frames included in the BB signal according to the resulting primary mode, the corresponding BB secondary mode and/or the MAC secondary mode. The signal processing may include decoding, amplifying, filtering, etc.

At 314, the second MAC module 74 may receive the frames from the second BB module 108 at a rate according to the resulting primary mode and the MAC secondary mode. The method may end at 316.

In FIG. 8, a mode selecting method is shown. Although the following tasks are primarily described with respect to the implementations of FIGS. 3 and 6-7 and Tables 1-4, the tasks may be easily modified to apply to other implementations of the present disclosure. The tasks may be iteratively performed. The tasks may be performed by each of the SoCs 56, 66 of the network devices 52, 54 and corresponding modules of the SoCs 56, 66. The tasks may be performed while performing corresponding tasks of FIGS. 6-7. For example, the tasks may be performed subsequent to tasks 200-209 and 300-307 and prior to or while performing tasks 210-216 and 308-314. The method of FIG. 8 is provided as an example. As an alternative or in addition to the method of FIG. 8, the modules of the SoCs 56, 66 may determine the secondary modes based on above-provided Table 4.

The method may begin at 400. At 402, the SoCs 56, 66 and/or modules (e.g., MAC modules 62, 74) of the SoCs 56, 66 select a primary mode. At 404, the SoCs 56, 66 and/or modules (e.g., the MAC modules 62, 74, the BB modules 90, 108 and the RF modules 92, 106) of the SoCs 56, 66 determine whether primary mode 1 is selected. If primary mode 1 is selected, tasks 406-410 are performed, otherwise task 412 is performed.

At 406, the RF modules 92, 106 selects RF secondary mode 1. At 408, the BB modules 90, 108 selects BB secondary mode 1. At 410, the MAC modules 62, 74 selects MAC secondary mode 2. The method may end subsequent to task 410 at 460.

At 412, the SoCs 56, 66 and/or modules (e.g., the MAC modules 62, 74, the BB modules 90, 108 and the RF modules 92, 106) of the SoCs 56, 66 determine whether primary mode 2 is selected. If primary mode 2 is selected, tasks 414-418 are performed, otherwise task 420 is performed.

At 414, the RF modules 92, 106 selects RF secondary mode 1. At 416, the BB modules 90, 108 selects BB secondary mode 1. At 418, the MAC modules 62, 74 selects MAC secondary mode 1. The method may end subsequent to task 418 at 460.

At 420, the SoCs 56, 66 and/or modules (e.g., the MAC modules 62, 74, the BB modules 90, 108 and the RF modules 92, 106) of the SoCs 56, 66 determine whether primary mode 3 is selected. If primary mode 3 is selected, tasks 422-426 are performed, otherwise task 428 is performed.

At 422, the RF modules 92, 106 selects RF secondary mode 2. At 424, the BB modules 90, 108 selects BB secondary mode 2. At 426, the MAC modules 62, 74 selects MAC secondary mode 1. The method may end subsequent to task 426 at 460.

At 428 the SoCs 56, 66 and/or modules (e.g., the MAC modules 62, 74, the BB modules 90, 108 and the RF modules 92, 106) of the SoCs 56, 66 determine whether primary mode 4 is selected. If primary mode 4 is selected, tasks 430-434 are performed, otherwise task 436 is performed.

At 430, the RF modules 92, 106 selects RF secondary mode 2. At 432, the BB modules 90, 108 selects BB secondary mode 1. At 434, the MAC modules 62, 74 selects MAC secondary mode 1. The method may end subsequent to task 434 at 460.

At 436, the SoCs 56, 66 and/or modules (e.g., the MAC modules 62, 74, the BB modules 90, 108 and the RF modules 92, 106) of the SoCs 56, 66 determine whether primary mode 5 is selected. If primary mode 5 is selected, tasks 438-442 are performed, otherwise task 444 is performed.

At 438, the RF modules 92, 106 selects RF secondary mode 2. At 440, the BB modules 90, 108 selects BB secondary mode 3. At 442, the MAC modules 62, 74 selects MAC secondary mode 1. The method may end subsequent to task 442 at 460.

At 444, the SoCs 56, 66 and/or modules (e.g., the MAC modules 62, 74, the BB modules 90, 108 and the RF modules 92, 106) of the SoCs 56, 66 determine whether primary mode 6 is selected. If primary mode 6 is selected, tasks 446-450 are performed, otherwise task 452 is performed.

At 446, the RF modules 92, 106 selects RF secondary mode 1. At 448, the BB modules 90, 108 selects BB secondary mode 3. At 450, the MAC modules 62, 74 selects MAC secondary mode 1. The method may end subsequent to task 450 at 460.

At 452, the SoCs 56, 66 and/or modules (e.g., the MAC modules 62, 74, the BB modules 90, 108 and the RF modules 92, 106) of the SoCs 56, 66 determine whether primary mode 7 is selected. If primary mode 7 is selected, tasks 454-458 are performed, otherwise may return to 402 as shown. Alternatively, task 404 may be performed after task 452 or the method may end at 460.

At 454, the RF modules 92, 106 selects RF secondary mode 1. At 456, the BB modules 90, 108 selects BB secondary mode 2. At 458, the MAC modules 62, 74 selects MAC secondary mode 1. The method may end subsequent to task 458 at 460.

The above-described tasks of FIGS. 6-8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The wireless communications described in the present disclosure can be conducted in full or partial compliance with IEEE standard 802.11-2012. In various implementations, IEEE 802.11-2012 may be supplemented by draft IEEE standard 802.11ac, draft IEEE standard 802.11ah, and/or draft IEEE standard 802.11af.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' refers to or includes: an Application Specific Integrated. Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit;

other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first network device comprising:
a medium access control module configured to operate in a plurality of primary modes including a first primary mode and a second primary mode,
wherein each of the plurality of primary modes fully or partially supports a corresponding one or more of Institute of Electrical and Electronics (IEEE) 802.11ah, IEEE 802.11ac, and IEEE 802.11af,
wherein the first primary mode fully or partially supports at least one of IEEE 802.11ah, IEEE 802.11ac, and IEEE 802.11af differently than the second primary mode, such that
the second primary mode is fully or partially compliant with a different one or more of IEEE 802.11ah, IEEE 802.11ac, and IEEE 802.11af than the first primary mode, or
if the second primary mode is fully or partially compliant with a same one or more of IEEE 802.11ah, IEEE 802.11ac, and IEEE 802.11af as the primary mode, then an amount of compliance with the same one or more of IEEE 802.11ah, IEEE 802.11ac, and IEEE 802.11af by the second primary mode is different than an amount of compliance with the IEEE 802.11ah, IEEE 802.11ac, and IEEE 802.11af by the first primary mode,
wherein each of IEEE 802.11ah, IEEE 802.11ac, and IEEE 802.11af is supported by at least one of the plurality of primary modes, and
wherein the medium access control module is configured to select the first primary mode from the plurality of primary modes;
a radio frequency module configured to, (i) based on the first primary mode, select a first band from a plurality of bands, wherein the plurality of bands include a sub-1 gigahertz (GHz) band, an IEEE 802.11ah band, and an IEEE 802.11af band, (ii) in the first band, receive a radio frequency signal or an intermediate frequency signal, and (iii) convert the radio frequency signal or the intermediate frequency signal to a baseband signal; and
a baseband module configured to, (i) based on the first primary mode, select a secondary mode and a first bandwidth from a plurality of bandwidths, wherein the secondary mode has a corresponding data rate, and wherein the plurality of bandwidths include (a) a bandwidth downclocked from an IEEE 802.11ac bandwidth, or (b) a 1 megahertz (MHz) bandwidth, (ii) receive the baseband signal from the radio frequency module, wherein the baseband signal has the first bandwidth, and (iii) based on the baseband signal, output a frame included in the baseband signal, wherein the medium access control module is configured to, based on the first primary mode and the secondary mode, receive the frame from the baseband module at the data rate.

2. The first network device of claim 1, wherein:
the medium access control module is configured to select the first primary mode from the plurality of primary modes based on a parameter; and
the parameter is a data rate or a distance between the first network device and a second network device.

3. The first network device of claim 1, wherein:
the radio frequency module is configured to switch from the first band to a second band;
the first band is an IEEE 802.11ah band; and
the second band is an IEEE 802.11af band.

4. The first network device of claim 1, wherein the first band is an IEEE 802.11ah band or an IEEE 802.11af band.

5. The first network device of claim 1, wherein the first bandwidth is (a) the bandwidth downclocked from the IEEE 802.11ac bandwidth, or (b) a 1 MHz bandwidth.

6. The first network device of claim 1, wherein the radio frequency module is configured to:
select a secondary mode based on the first primary mode; and
while operating in the secondary mode selected by the radio frequency module, (i) receive the radio frequency signal over a channel, wherein the channel has a bandwidth of a television channel, or (ii) tune to a second band, wherein the second band is a band of the television channel.

7. The first network device of claim 1, wherein:
the baseband module is configured to (i) perform a plurality of operations, and (ii) while operating in the secondary mode selected by the baseband module, determine which one of the plurality of operations to perform; and
the plurality of operations include (i) receiving the baseband signal having a non-IEEE 802.11ac preamble, (ii) receiving the baseband signal having a bandwidth downclocked from the IEEE 802.11ac bandwidth, and (iii) receiving the baseband signal having an IEEE 802.11ac preamble.

8. The first network device of claim 1, wherein:
the baseband module is configured to (i) perform a plurality of operations, and (ii) while operating in the secondary mode selected by the baseband module, determine which one of the plurality of operations to perform; and
the plurality of operations include (i) receiving the baseband signal having a non-IEEE 802.11ac preamble and a bandwidth 10× downclocked from the IEEE 802.11ac bandwidth, (ii) receiving the baseband signal having a bandwidth 7.5× downclocked from the IEEE 802.11ac bandwidth, and (iii) receiving the baseband signal having an IEEE 802.11ac preamble and a bandwidth 10× downclocked from the IEEE 802.11ac bandwidth.

9. The first network device of claim 1, wherein:
the medium access control module is configured to (i) based on the first primary mode, select a secondary mode, and (ii) receive the frame at a data rate, wherein the data rate corresponds to the secondary mode selected by the medium access module; and
the medium access control module is configured to, according to the secondary mode selected by the medium access control module, (i) increase interframe space values at a downclock ratio, or (ii) partially support the IEEE 802.11ah standard,
wherein the baseband module is configured to, based on the downclock ratio, downclock the bandwidth from the IEEE 802.11ac bandwidth.

10. The first network device of claim 9, wherein:
the medium access control module is configured to, during the secondary mode selected by the medium access control module, (i) partially support the IEEE 802.11ah standard, (ii) receive the frame from the baseband module such that the frame has a format of length less than or equal to a predetermined length, and (iii) receive the frame in a time slot allocated to the first network device or a second network device; and
the radio frequency module is configured to receive the radio frequency signal or the intermediate frequency signal from the second network device.

11. The first network device of claim 1, wherein the radio frequency module is configured to:
select a secondary mode based on the first primary mode; and
while operating in the secondary mode selected by the radio frequency module,
tune to a second band, wherein the second band is a band of a television channel, and
receive the radio frequency signal over the television channel.

12. The first network device of claim 1, wherein:
the radio frequency module is configured to transmit a beacon; and
the medium access control module is configured to (i) receive a response signal from a second network device based on the beacon, and (ii) based on the response signal, switch from the first primary mode to the second primary mode.

13. The first network device of claim 1, wherein:
the first primary mode supports IEEE 802.11ah, IEEE 802.11ac and IEEE 802.11af;
the second primary mode supports IEEE 802.11ah and does not support IEEE 802.11ac and IEEE 802.11af; and
the plurality of primary modes include a third primary mode that supports IEEE 802.11af and does not support IEEE 802.11ah and IEEE 802.11ac.

14. A first network device comprising:
a medium access control module configured to configured to operate in a plurality of primary modes including a first primary mode and a second primary mode,
wherein each of the plurality of primary modes fully or partially supports a corresponding one or more of Institute of Electrical and Electronics (IEEE) 802.11ah, IEEE 802.11ac, and IEEE 802.11af,
wherein the first primary mode fully or partially supports at least one of IEEE 802.11ah, IEEE 802.11ac, and IEEE 802.11af differently than the second primary mode, such that
the second primary mode is fully or partially compliant with a different one or more of IEEE 802.11ah, IEEE 802.11ac, and IEEE 802.11af than the first primary mode, or
if the second primary mode is fully or partially compliant with a same one or more of IEEE 802.11ah, IEEE 802.11ac, and IEEE 802.11af as the primary mode, then an amount of compliance with the same one or more of IEEE 802.11ah, IEEE 802.11ac, and IEEE 802.11af by the second primary mode is different than an amount of compliance with the IEEE 802.11ah, IEEE 802.11ac, and IEEE 802.11af by the first primary mode, wherein each of IEEE 802.11ah, IEEE 802.11ac, and IEEE 802.11af is supported by at least one of the plurality of primary modes, and wherein the medium access control module is configured to (i) select the first primary mode from the plurality of primary modes, (ii) receive a frame, and (iii) based on the first primary mode, select a secondary mode, wherein the secondary mode has a corresponding data rate;

a baseband module configured to (i) based on the first primary mode, select a secondary mode and a first bandwidth from a plurality of bandwidths, wherein the plurality of bandwidths include (a) a bandwidth downclocked from an IEEE 802.11ac bandwidth, or (b) a 1 megahertz (MHz) bandwidth, (ii) receive the frame from the medium access control module, and (iii) based on the secondary mode selected by the baseband module, generate a baseband signal including the frame, wherein the baseband signal has the first bandwidth; and a radio frequency module configured to, (i) based on the first primary mode, select a first band from a plurality of bands, wherein the plurality of bands includes a sub-1 gigahertz (GHz) band, an IEEE 802.11ah band, and an IEEE 802.11af band, (ii) based on the baseband signal, generate a radio frequency signal or an intermediate frequency signal, and (iii) transmit the radio frequency signal in the first band.

15. The first network device of claim 14, wherein:
the medium access control module is configured to select the first primary mode from the plurality of primary modes based on a parameter; and
the parameter is a data rate or a distance between the first network device and a second network device.

16. The first network device of claim 14, wherein:
the radio frequency module is configured to switch from the first band to a second band;
the first band is an IEEE 802.11ah band; and
the second band is an IEEE 802.11af band.

17. The first network device of claim 14, wherein the first band is an IEEE 802.11ah band or an IEEE 802.11af band.

18. The first network device of claim 14, wherein the first bandwidth is (a) the bandwidth downclocked from the IEEE 802.11ac bandwidth, or (b) a 1 MHz bandwidth.

19. The first network device of claim 14, wherein the radio frequency module is configured to:
select a secondary mode based on the first primary mode; and
while operating in the secondary mode selected by the radio frequency module, (i) transmit the radio frequency signal over a channel, wherein the channel has a bandwidth of a television channel.

20. The first network device of claim 14, wherein:
the baseband module is configured to (i) perform a plurality of operations, and (ii) while operating in the secondary mode selected by the baseband module, determine which one of the plurality of operations to perform; and
the plurality of operations include (i) generating the baseband signal having a non-IEEE 802.11ac preamble, (ii) generating the baseband signal having a bandwidth downclocked from the IEEE 802.11ac bandwidth, and (iii) generating the baseband signal having an IEEE 802.11ac preamble.

21. The first network device of claim 14, wherein:
the baseband module is configured to (i) perform a plurality of operations, and (ii) while operating in the secondary mode selected by the baseband module, determine which one of the plurality of operations to perform; and
the plurality of operations include (i) generating the baseband signal having a non-IEEE 802.11ac preamble and a bandwidth 10× downclocked from the IEEE 802.11ac bandwidth, (ii) generating the baseband signal having a bandwidth 7.5× downclocked from the IEEE 802.11ac bandwidth, and (iii) generating the baseband signal having an IEEE 802.11ac preamble and a bandwidth 10× downclocked from the IEEE 802.11ac bandwidth.

22. The first network device of claim 14, wherein:
the medium access control module is configured to (i) based on the first primary mode, select a secondary mode, and (ii) transmit the frame at a data rate to the baseband module, wherein the data rate corresponds to the secondary mode selected by the medium access module; and
the medium access control module is configured to, according to the secondary mode selected by the medium access control module, (i) increase interframe space values at a downclock ratio, or (ii) partially support the IEEE 802.11ah standard,
wherein the baseband module is configured to, based on the downclock ratio, downclock the bandwidth from the IEEE 802.11ac bandwidth.

23. The first network device of claim 22, wherein:
the medium access control module is configured to, during the secondary mode selected by the medium access control module, (i) partially support the IEEE 802.11ah standard, (ii) transmit the frame to the baseband module such that the frame has a format of length less than or equal to a predetermined length, and (iii) transmit the frame in a time slot allocated to the first network device or a second network device; and
the radio frequency module is configured to transmit the radio frequency signal or the intermediate frequency signal to the second network device.

\* \* \* \* \*